No. 893,781. PATENTED JULY 21, 1908.
K. W. CARLGREN.
CAR BRAKE.
APPLICATION FILED NOV. 29, 1907.
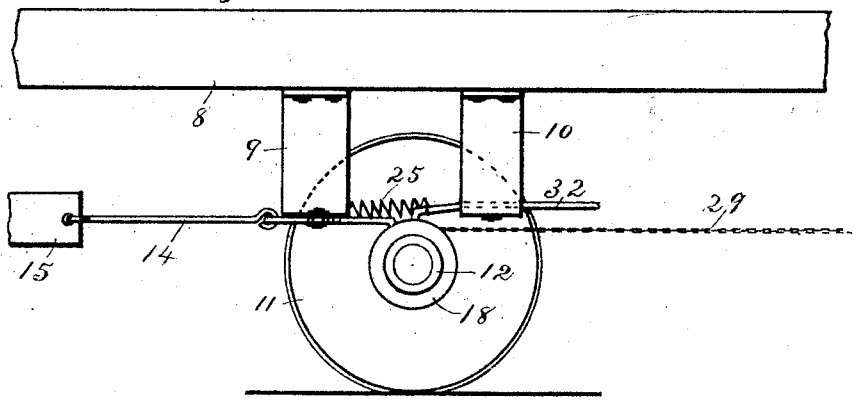
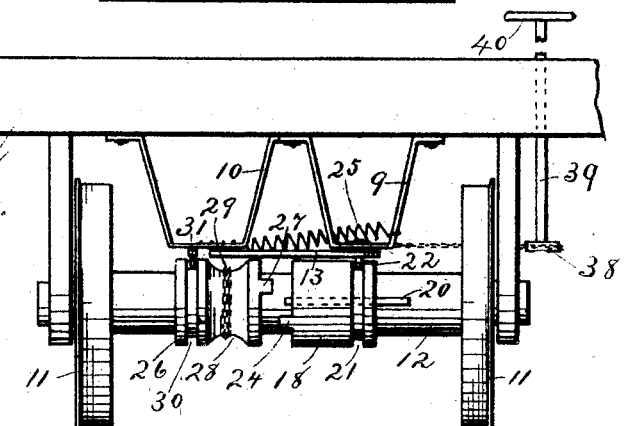
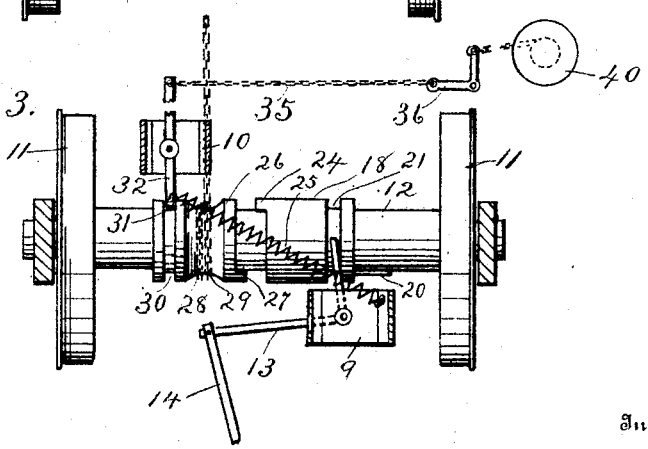
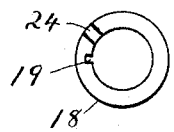
Witnesses
C. A. Neale
W. E. Wright
Inventor
Knut W. Carlgren.
By Chas. L. Swett,
Attorney

UNITED STATES PATENT OFFICE.

KNUT W. CARLGREN, OF SALT LAKE CITY, UTAH.

CAR-BRAKE.

No. 893,781.     Specification of Letters Patent.     Patented July 21, 1908.

Application filed November 29, 1907. Serial No. 404,439.

*To all whom it may concern:*

Be it known that I, KNUT W. CARLGREN, a citizen of the United States, residing at Salt Lake City, in the county of Salt Lake and State of Utah, have invented certain new and useful Improvements in Car-Brakes, of which the following is a specification.

It is well known that when a car coupling on a moving train breaks, or fails to hold, the car or cars, thus separated ordinarily run wild, and do serious damage to life and property: and the object of this invention is to automatically apply the brake on such a car, by mechanism actuated by this accidental separation of the car from others preceding it in a train. The brake effect is produced by causing a chain attached to the brake beam, to be wound upon an axle on the car truck.

In my application for a patent for a "pipe coupling," of even date herewith, I use a reciprocating, twisted plate, which is caused to move at the instant of the detachment of a car, and to this twisted plate, as actuating means, I connect the mechanism of this device. But any other means may be employed. I also connect this device with the hand brake, so that it may be controlled by the brakeman.

The accompanying drawing illustrates the device, in which

Figure 1 is a side elevation of the device, suspended to the under side of a car, a wheel of the car truck being removed to better expose the mechanism. Fig. 2 is a fragmentary end elevation of the device, Fig. 3 is a fragmentary plan view of the same, the car body being removed; and Fig. 4 is an end view of a band, constituting one member of a clutch employed.

The character 8 designates the bottom of a car.

9 and 10 are hangers connected to the car bottom and supporting parts of my device.

11, 11, are the truck wheels, and 12 is the axle connecting these wheels.

15 is the end of the reciprocating plate referred to in the statement above, and 14 is a rod connecting said plate with the bell lever 13, which moves the band 18. On the axle 12, I place this band 18, which constitutes one member of a clutch. Said member is movable, longitudinally on said axle, and has a groove 19, to engage a key 20, on the axle, and thus is made to revolve with said axle. 26 is the other member of the clutch having a lug 27, to engage lug 24, on band 18. It is also provided with a groove 28, for a chain 29, to be connected with a brake beam, and a groove 30 which engages a pin 31 on the lever 32, the latter being connected by chain 35 through the bell lever 36, with the chain wheel 38 on the pinion 39, controlled by the brakeman through hand wheel 40. A contractile spring 25 connecting lever 32 with hanger 9, restores band wheel 26 to its normal position, when moved therefrom by the brakeman. This device becomes operative when the movement of plate 15 and rod 14 throws clutch member 18 into engagement with member 26, whereby the chain 29, is wound upon member 26, and the brakes are forced against the wheels.

What I claim and desire to secure is—

1. A car brake comprising a car axle, a clutch on said axle whose member 18 rotates with said axle and is also movable longitudinally on said axle, a clutch member 26 loose on said axle and engageable by said member 18, a chain on said clutch member 26 connecting with the brake beam and means to throw said clutch member into engagement with said member 26, as specified.

2. A car brake comprising hangers beneath the car, a car axle, a clutch on said axle whose member 18 is keyed to said axle and is longitudinally movable thereon, and has an annular groove therein, a bell lever whose point engages said groove and is connected with the actuating means, clutch member 26 having an annular groove, a lever 32 whose point engages said groove, said lever 32 having connection with a brake staff and hand wheel, a contractile spring connecting said lever 32 to a hanger and a chain on said clutch member 26 to connect with the brake beam, as herein set forth.

In testimony whereof I affix my signature, in presence of two witnesses.

KNUT W. CARLGREN.

Witnesses:
    HYRUM BURKE,
    WILLIAM R. HALL.